(12) United States Patent
Eastty et al.

(10) Patent No.: US 6,970,753 B2
(45) Date of Patent: Nov. 29, 2005

(54) STORAGE AND TRANSMISSION OF ONE-BIT DATA

(75) Inventors: Peter Charles Eastty, Oxford (GB); Christopher Sleight, Chipping Norton (GB); Peter Damien Thorpe, Oxford (GB)

(73) Assignees: Sony Corporation, Tokyo (JP); Sony United Kingdom Limited, Weybridge (GB)

( * ) Notice: Subject to any disclaimer, the term of this patent is extended or adjusted under 35 U.S.C. 154(b) by 463 days.

(21) Appl. No.: 09/884,208

(22) Filed: Jun. 19, 2001

(65) Prior Publication Data

US 2002/0026254 A1 Feb. 28, 2002

Related U.S. Application Data

(63) Continuation of application No. 08/979,470, filed on Nov. 26, 1997.

(30) Foreign Application Priority Data

Nov. 27, 1996 (GB) .................................... 9624670

(51) Int. Cl.[7] ............................................ G06F 17/00
(52) U.S. Cl. ..................... 700/94; 375/247; 341/143
(58) Field of Search ........................ 341/143; 375/247; 708/307; 700/94

(56) References Cited

U.S. PATENT DOCUMENTS

| | | | |
|---|---|---|---|
| 3,916,179 A * | 10/1975 | Cuzzo ......................... | 708/829 |
| 4,142,066 A * | 2/1979 | Ahamed ...................... | 704/233 |
| 4,813,040 A | 3/1989 | Futato | |
| 5,142,551 A | 8/1992 | Borth et al. | |
| 5,347,587 A | 9/1994 | Takahashi et al. | |
| 5,451,942 A | 9/1995 | Beard et al. | |
| 5,550,825 A | 8/1996 | McMullan, Jr. et al. | |
| 5,682,162 A | 10/1997 | Hamasaki et al. ........... | 341/144 |
| 5,719,574 A * | 2/1998 | Nishio et al. ................ | 341/143 |
| 5,793,318 A * | 8/1998 | Jewett ......................... | 341/118 |
| 6,094,458 A * | 7/2000 | Hellberg ...................... | 375/242 |

FOREIGN PATENT DOCUMENTS

| | | |
|---|---|---|
| EP | 0 385 288 | 9/1990 |
| EP | 0 607 714 | 7/1994 |
| EP | 0 735 461 | 10/1996 |
| GB | 1 329 883 | 9/1973 |
| GB | 2 101 849 | 1/1983 |
| GB | 2 125 654 | 3/1984 |
| GB | 2 285 563 | 4/1994 |
| GB | 2 287 624 | 9/1995 |
| JP | 63 94718 | 4/1988 |

OTHER PUBLICATIONS

Patent Abstracts of Japan, vol. 017, No. 174 (E-1346), Apr. 5, 1993, & JP 04 331517 A ( RICOH Co Ltd), Nov. 19, 1992.

* cited by examiner

Primary Examiner—Brian T. Pendleton
(74) Attorney, Agent, or Firm—Frommer Lawrence & Haug LLP; William S. Frommer; Thomas F. Presson

(57) ABSTRACT

Apparatus for storing or transmitting a one-bit digital signal comprises an input inverter for inverting a subset of the data bits of an input one-bit digital signal, to generate a bit-inverted signal; a storage or transmission medium for storing or transmitting the bit-inverted signal; and an output inverter for inverting the subset of the data bits of the bit-inverted signal, to regenerate the input one-bit digital signal.

11 Claims, 1 Drawing Sheet

STORAGE AND TRANSMISSION OF ONE-BIT DATA

This application is a continuation of U.S. application Ser. No. 08/979,470 filed Nov. 26, 1997.

BACKGROUND OF THE INVENTION

1. Field of the Invention

This invention relates to the storage and transmission of one-bit (or "delta-sigma modulated") data, such as one-bit digital audio signals.

2. Description of the Prior Art

A convenient way of storing one-bit digital audio signals with currently available equipment is to multiplex groups of bits of the one-bit signal into data words, and then to record the data words on conventional multi-bit PCM recording equipment. For example, a one-bit signal at 64 fs (where fs is, for example, 48 kHz) can be treated in this way by multiplexing 64 successive bits of the one-bit signal into 4×16-bit words, which can then be recorded on two stereo channels of a standard so-called AES/EBU digital audio recorder.

However, if there is a replay problem and the AES/EBU recorder mutes, its output goes to a continuous stream of digital zeroes. In a PCM system, a continuous stream of zeroes would be decoded as silence. However, in a one-bit data stream, a continuous stream of zeroes would be decoded as a very large magnitude audio signal—in fact, larger than the peak signal that most one-bit systems are designed to handle.

Similar problems can occur when one-bit data is stored or transmitted without necessarily reformatting the data into data words; if the signal disappears or mutes to a steady sequence of the same bit value, then this is equivalent to a very loud noise (or, more generally, a very large signal) in the one-bit system.

SUMMARY OF THE INVENTION

This invention provides apparatus for storing and/or transmitting a one-bit digital signal, the apparatus comprising:

an input inverter for inverting a subset of the data bits of an input one-bit digital signal, to generate a bit-inverted signal;

a storage and/or transmission medium for storing and/or transmitting the bit-inverted signal; and an output inverter for inverting the subset of the data bits of the bit-inverted signal, to regenerate the input one-bit digital signal.

The invention addresses the above problems by inverting a subset (e.g. 50%) of the data bits of the one-bit signal before they are recorded or transmitted, and then re-inverting that subset on reception or reproduction. This provides a processing scheme which is transparent to the signals when they are properly received or reproduced. However, if the signal disappears or the recording or transmission system outputs a continuous stream of ones or zeroes during a mute, the alternate bit inversion built into the replay or reception side of the apparatus will generate a one-bit output signal having a subset of inverted bits, representing a lower level signal in the one-bit domain. Indeed, in one embodiment, alternate bits of the input signal are inverted and so the output during a mute would be alternate ones and zeroes—the one-bit equivalent of digital silence.

This invention also provides apparatus for formatting a one-bit digital signal for storage and/or transmission, the apparatus comprising an inverter for inverting a subset of the data bits of an input one-bit digital signal, to generate a bit-inverted signal to be stored or transmitted.

This invention also provides apparatus for receiving a one-bit digital signal after storage and/or transmission, the apparatus comprising an inverter for inverting a subset of the data bits of the received one-bit digital signal.

This invention also provides a method of storing and/or transmitting a one-bit digital signal, the method comprising the successive steps of:

(i) inverting a subset of the data bits of an input one-bit digital signal, to generate a bit-inverted signal;

(ii) storing and/or transmitting the bit-inverted signal; and (iii) inverting the subset of the data bits of the bit-inverted signal, to regenerate the input one-bit digital signal.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
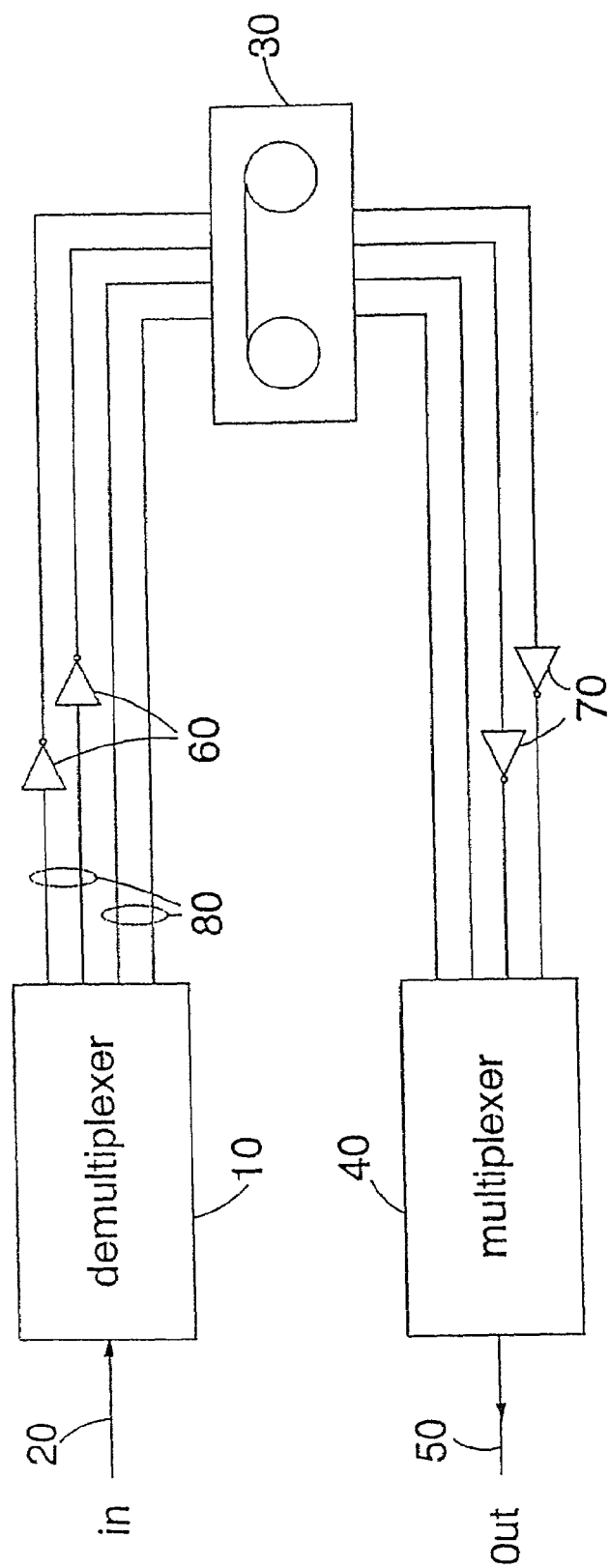
FIG. 1 schematically illustrates a data recording system.

Referring now to the drawings, a one-bit digital data recording system comprises a demultiplexer 10 for receiving an input one-bit digital audio signal 20, a data recorder 30 (in this case, a so-called AES/EBU standard digital audio recorder), and a multiplexer 40 for generating an output one-bit digital audio signal 50. Bit-inverters 60 and 70 are connected between the demultiplexer 10 and the data recorder 30 and between the data recorder 30 and the multiplexer 40.

The input one-bit signal 20 comprises successive individual data bits:

$b_1, b_2, b_3, b_4, b_5, b_6, b_7 \ldots, \ldots b_{63}, b_{64}, b_{65}, b_{66}, \ldots$ However, the AES/EBU recorder 30 is designed to record 16-bit data words (each representing a PCM audio sample) at a sampling rate of 48 kHz.

So, the demultiplexer 10 forms groups of the data bits of the one-bit input signal and passing them to the AES/EBU recorder 30 for recording as though they were 16-bit PCM data words.

In the present example, the one-bit digital audio signal has a data rate (bit rate) of 64 fs, where fs is 48 kHz, and so for each sample period of the 48 kHz AES/EBU recorder, 64 bits of the one-bit digital audio signal must be multiplexed and recorded as data words. Therefore, four 16-bit data words are required to be formed for each 48 kHz sample period.

Four data words per sample period correspond to four audio channels being recorded on the AES/EBU data recorder. In fact, this can be configured as two stereo channels to accommodate the four data words per sample period. The two stereo channels are represented by pairs of signals 80, 90 in FIG. 1.

[1] In fact, a stereo pair in a PCM AES/EBU system comprises alternate PCM samples and so each stereo pair would be carried by a single schematic "wire" in FIG. 1. However, to assist in the explanation, four "wires" are shown emerging from the demultiplexer 10.

The way in which the demultiplexer 10 divides the input one-bit digital audio signal into the data words is first to generate two bit streams, each comprising alternate data bits from the input one-bit signal. Therefore, the bit streams would contain:

bit stream 1: $b_1, b_3, b_5, b_7, \ldots$
bit stream 2: $b_4, b_6, b_8,$

Each of the two bit streams is then sub-divided to form the two channels of a respective stereo pair, for recording on the AES/EBU recorder. This is done by taking alternate groups of 16 adjacent bits and assigning them to one of the left and right channels of that stereo pair. So, using the notation established above, the following 16-bit data words would be generated for recording on the AES/EBU recorder 30:

Stereo pair A:
left: $b_1, b_3, b_5 \ldots b_{29}, b_3$
right: $b_{33}, b_{35}, b_{37}, b_{39} \ldots b_{61}, b_{63}$ Stereo pair B:
left: $b_2, b_4, b_6 \ldots b_{30}, b_{32}$
right: $b_{34}, b_{36}, b_{38}, b_4 \ldots b_{62}, b_{64}$ The inverters 60 invert the data bits of one of the stereo pairs before recording. Similar inverters 70 invert the same stereo pair when it is reproduced from the recorder 30. Because each stereo pair is formed from a respective bit stream, which in turn is formed of alternate bits of the input one-bit signal, the inverters 60 have the effect of inverting alternate bits of the input one-bit signal. These bits are then re-inverted on replay by the inverters 70 to reconstruct the bits of the input one-bit signal.

The multiplexer 40 operates in a complementary manner to the demultiplexer 10, to convert replayed 16-bit data words into the one-bit signal $b_1, b_2, b_3, b_4 \ldots$ One advantage of this embodiment is that if there is an error which leads to a failure during replay on the AES/EBU recorder 30, that recorder will "mute" to a signal comprising successive digital zeroes. This is no problem in a PCM system, because a signal of all zeroes represents silence. However, in a one-bit signal, a signal of all zeroes represents a very loud noise indeed.

However, since the inverters 70 are operable to invert alternate bits output by the AES/EBU recorder (alternate in the sense that they become alternate within the one-bit signal output by the multiplexer 40) a mute signal is transformed into an output one-bit signal comprising alternate ones and zeroes. A signal of alternate ones and zeroes is a close representation of silence in a one-bit system.

Similarly, when replay is ceased (e.g. by pressing the stop button on the recorder 30) a mute signal may also be output and will be treated in the same way.

In other embodiments, the recorder 30 may be replaced by a transmission medium such as a cable, optical fibre or satellite link. If the transmission medium is disconnected or fails in any other way, or if it mutes through any transmission problems, then the inverters 70 have the same effect of transforming a PCM digital silence into a one-bit digital silence signal.

It is not of course necessary for the digital silence signal in the one-bit system to be alternate ones and zeroes (and of course it is not necessary for the signal to be multiplexed into data words for the inversion to take place). In fact, any inversion pattern which results in a silence signal having a substantially even distribution of ones and zeroes could perform the same function, and indeed there can be advantages in using an inversion pattern which inverts, perhaps, four bits at "random" positions within each 8-bit group of the input one-bit signal, to "spread out" the spectral energy of the "digital silence" signal. (Here, it is noted that a concentration of spectral energy within a one-bit digital signal can lead to instability of signal processing apparatus receiving that signal.)

Figure 2:
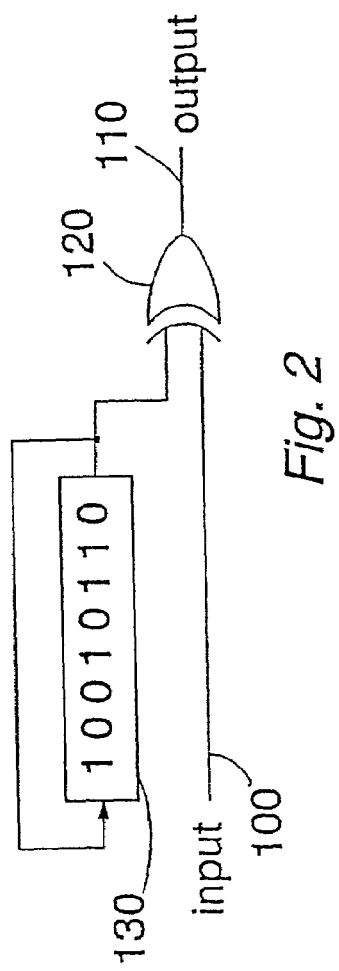
FIG. 2 schematically illustrates a bit inverter.

FIG. 2 schematically illustrates a generic bit inverter which could perform this function in place of the inverters 60 and 70.

In FIG. 2, a bit stream to be inverted is supplied on an input 100, and a bit-inverted bit stream is generated at an output 110.

The inversion is performed by an exclusive-OR gate 120, which acts on two inputs: the input signal 100 and a bit stream generated by a shift register 130 connected in a feedback arrangement so that it repeatedly supplies a sequence of (in this case) eight bits to the exclusive-OR gate 120.

When the shift register 130 supplies a 0 to the exclusive-OR gate 120, no inversion takes place. When the shift register 130 supplies a 1 to the exclusive-OR gate 120, the current input bit on the input 100 is inverted.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for storing and/or transmitting a one-bit signal, the apparatus comprising:
   an input inverter for inverting alternate data bits of an input one-bit digital signal, to generate a bit-inverted signal;
   a storage and/or transmission medium for storing and/or transmitting said bit-inverted signal; and
   an output inverter for inverting alternate data bits of said bit-inverted signal, to regenerate said input one-bit digital signal;
   wherein, to invert said alternate data bits of said input one-bit digital signal, said one-bit signal is split into two bit streams, one bit stream having odd data bits and one bit stream having even data bits; and
   wherein each of said two bit streams is subdivided to form channel pairs before recording is performed in order to prevent errors that occur due to a mute operation of said storage and/or transmission medium.

2. Apparatus according to claim 1, in which said storage and/or transmission medium is operable to output a mute signal comprising successive data bits of the same data value if a storage, reproduction and/or transmission error, failure or cessation occurs.

3. Apparatus according to claim 1, in which said input one-bit digital signal is a one-bit digital audio signal.

4. Apparatus according to claim 1, in which said storage and/or transmission medium is operable to store and/or transmit data words each having a predetermined number of data bits.

5. Apparatus according to claim 4, in which:
   said storage and/or transmission medium is an AES/EBU standard digital audio recorder; and
   said predetermined number of bits in each data word is 16 bits.

6. Apparatus according to claim 1, in which said input inverter comprises:
   means for providing an inversion control signal having a signal state varying between two predetermined states; and control logic operable to selectively invert data bits of said input one-bit digital signal in response to a current state of said inversion control signal.

7. Apparatus according to claim 6, in which:
said providing means comprises a shift register having a one-bit output fed back to an input of said shift register; and
said control logic comprises an exclusive-OR gate operable to combine a current bit output by said shift register with a current bit of said input one-bit digital signal.

8. Apparatus for storing and/or transmitting a one-bit signal, the apparatus comprising:
an input inverter for inverting a subset of the data bits of an input one-bit digital signal, to generate a bit-inverted signal;
a storage and/or transmission medium for storing and/or transmitting said bit-inverted signal;
an output inverter for inverting said subset of the data bits of said bit-inverted signal, to regenerate said input one-bit digital signal;
wherein said storage and/or transmission medium is operable to store and/or transmit data words each having a predetermined number of data bits; and
a multiplexer for multiplexing the data bits of the input one-bit signal into data words each having said predetermined number of data bits;
said input inverter being operable to invert a subset of data words output by said multiplexer, to form said bit-inverted signal;
wherein, to invert said alternate data bits of said input one-bit digital signal, said one-bit signal is split into two bit streams, one bit stream having odd data bits and one bit stream having even data bits; and
wherein each of said two bit streams is subdivided to form channel pairs before recording is performed in order to prevent errors that occur due to a mute operation of said storage and/or transmission medium.

9. Apparatus according to claim 8, in which said output inverter is operable to invert said subset of data words of said bit-inverted signal;
said apparatus comprising a demultiplexer for demultiplexing data words output by said output inverter, to regenerate said input one-bit digital signal.

10. Apparatus for formatting a one-bit digital signal for storage and/or transmission, said apparatus comprising an inverter for inverting alternate data bits of an input one-bit digital signal, to generate a bit-inverted signal to be stored or transmitted;
wherein, to invert said alternate data bits of said input one-bit digital signal, said one-bit signal is split into two bit streams, one bit stream having odd data bits and one bit stream having even data bits; and
wherein each of said two bit streams is subdivided to form channel pairs before recording is performed in order to prevent errors that occur due to a mute operation of a storage and/or transmission medium.

11. Apparatus for receiving a one-bit digital signal after storage and/or transmission, said apparatus comprising an inverter for inverting alternate data bits of the received one-bit digital signal;
wherein, to invert said alternate data bits of said input one-bit digital signal, said one-bit signal is split into two bit streams, one bit stream having odd data bits and one bit stream having even data bits; and
wherein each of said two bit streams is subdivided to form channel pairs before recording is performed in order to prevent errors that occur due to a mute operation of a storage and/or transmission medium.

* * * * *